(12) United States Patent
Feng et al.

(10) Patent No.: US 7,654,743 B2
(45) Date of Patent: Feb. 2, 2010

(54) BEARING ASSEMBLY, MOTOR AND RECORDING DISK DRIVE

(75) Inventors: Ming Feng, Kyoto (JP); Satoru Sodeoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 408 days.

(21) Appl. No.: 11/613,252

(22) Filed: Dec. 20, 2006

(65) Prior Publication Data

US 2007/0140606 A1    Jun. 21, 2007

(51) Int. Cl.
*F16C 32/06* (2006.01)
(52) U.S. Cl. .................. 384/107; 384/100; 384/112; 310/90
(58) Field of Classification Search .......... 384/100, 384/107, 112–119, 123, 130, 132; 310/90, 310/90.05; 360/99.04, 99.07–99.08
See application file for complete search history.

(56) References Cited

U.S. PATENT DOCUMENTS

| 4,254,961 | A | * | 3/1981 | Fersht et al. ............... 310/90.5 |
| 5,516,212 | A | * | 5/1996 | Titcomb .................... 384/107 |
| 5,558,445 | A | * | 9/1996 | Chen et al. ................. 384/132 |
| 5,634,724 | A | * | 6/1997 | Zang et al. ................. 384/107 |
| 5,658,080 | A | * | 8/1997 | Ichiyama ................... 384/112 |
| 5,988,886 | A | * | 11/1999 | Takahashi .................. 384/107 |
| 6,793,394 | B2 | | 9/2004 | Gomyo et al. |
| 6,888,278 | B2 | * | 5/2005 | Nishimura et al. ............ 310/90 |
| 6,939,047 | B2 | * | 9/2005 | Gomyo et al. ............... 384/107 |
| 7,056,026 | B2 | * | 6/2006 | Grantz et al. ................ 384/119 |
| 7,201,517 | B2 | * | 4/2007 | Gomyo et al. ............... 384/107 |
| 7,401,979 | B2 | * | 7/2008 | Ando et al. ................. 384/107 |
| 7,473,034 | B2 | | 1/2009 | Saito et al. |
| 2006/0029312 | A1 | * | 2/2006 | Kiriyama et al. ............ 384/107 |
| 2006/0039634 | A1 | * | 2/2006 | Ichiyama .................... 384/100 |

FOREIGN PATENT DOCUMENTS

| JP | 2005-048890 A | 2/2005 |
| JP | 3673799 B2 | 7/2005 |

* cited by examiner

*Primary Examiner*—Marcus Charles
(74) *Attorney, Agent, or Firm*—Keating & Bennett, LLP.

(57) ABSTRACT

A bearing assembly for use in an electric motor minimizes the generation of a negative pressure. In the bearing assembly, gaps are formed between a shaft provided with a flange portion, a ring member mounted on the shaft, and a sleeve member with a through hole formed therein are continuously filled with lubrication oil. When a rotor rotates, the rotor is supported by a fluid dynamic pressure. In the bearing assembly, herringbone grooves are formed in an upper surface of the flange portion of the shaft fixed to a base plate. When the sleeve member rotates with respect to the shaft, ends of all of the herringbone grooves and the through hole are superposed on each other sequentially. Thus, the lubrication oil can be efficiently supplied to an outer peripheral region in the thrust dynamic pressure bearing mechanism in which the negative pressure is most prone to be generated, and generation of the negative pressure can be efficiently minimized.

15 Claims, 10 Drawing Sheets

BEARING ASSEMBLY, MOTOR AND RECORDING DISK DRIVE

BACKGROUND OF THE INVENTION

1. Field of Invention

The present invention relates to a bearing assembly utilizing a fluid dynamic pressure provided in a motor.

2. Description of the Related Art

A recording disk drive such as a hard disk drive includes a spindle motor (hereinafter referred to as "motor") for rotating a recording disk. The motor uses a bearing assembly utilizing a fluid dynamic pressure. In many cases in the bearing assembly, a thrust dynamic pressure bearing mechanism and a radial dynamic pressure bearing mechanism are provided between a shaft or a component of the bearing assembly connected to the shaft and a sleeve into which the shaft is inserted.

The structure of an exemplary known bearing assembly includes an inner sleeve and an outer sleeve combined to form a sleeve, and a shaft is inserted into the sleeve. A radial bearing is formed between an outer peripheral surface of the shaft and an inner peripheral surface of the inner sleeve. Thrust bearings are provided at an upper end surface and a lower end surface of the inner sleeve, respectively. A vertically extending path for fluid is provided between the inner sleeve and the outer sleeve. Annular taper seals are formed between the outer sleeve and a sealing plate opposed to the upper end surface of the inner sleeve, and between the outer sleeve and a flange portion of the shaft opposed to the lower end surface of the inner sleeve.

There is another known bearing assembly. In this bearing assembly, a space is defined by the sleeve fixed to a base and a counter plate which closes a bottom opening of the sleeve. The shaft which is to rotate, and a thrust plate which is opposed to the counter plate with lubrication fluid interposed therebetween are accommodated in the space. A fluid circulating path is formed between the shaft and the thrust plate and brings a pair of thrust dynamic pressure bearing mechanisms formed on and below the thrust plate into communication with each other. In still another exemplary bearing assembly, a pair of thrust dynamic pressure bearing mechanisms are formed between a cylindrical sleeve having a bottom and a lower surface of an annular thrust portion which is formed integrally with the shaft, and between an upper surface of the thrust portion and an annular upper plate which closes an opening of the sleeve. A through hole is formed in the thrust dynamic pressure bearing mechanism from its inner peripheral edge to its intermediate portion so as to extend in an axial direction parallel to a center axis of the bearing assembly.

In a dynamic pressure groove in an outer peripheral portion of the thrust dynamic pressure bearing mechanism, a negative pressure is locally generated due to a difference in a flow velocity of lubrication oil or the like, and air bubbles generated by the negative pressure build up in some cases. The air bubbles cause troubles such as NRRO (Non Repeatable Run Out) due to abnormal vibration when the motor rotates, thus adversely affecting reading and writing of information from and on a recording disk and a lifetime of the bearing assembly.

In the aforementioned known bearing assemblies, however, the thrust dynamic pressure groove and the circulation path for the lubrication oil are formed in the rotating component, and the position of the circulation path is fixed with respect to the thrust dynamic pressure groove. Therefore, generation of the negative pressure can be minimized in a certain dynamic pressure groove, but it is not possible to supply the lubrication oil to all portions of the dynamic pressure grooves at which the negative pressure is generated.

SUMMARY OF THE INVENTION

In order to overcome the problems described above, preferred embodiments of the present invention minimize generation of negative pressure in a thrust dynamic pressure bearing mechanism of an electric motor, thereby preventing the generation of air bubbles in a lubrication oil.

According to a preferred embodiment of the present invention, a bearing assembly includes a shaft provided at its end with a flange portion extending outwardly from a center axis of the shaft; an approximately cylindrical sleeve member inserted onto the shaft and having a first end surface opposed to the flange portion and a second end surface opposite to the first end surface; a radial dynamic pressure bearing mechanism formed between an outer peripheral surface of the shaft and an inner peripheral surface of the sleeve member; and a thrust dynamic pressure bearing mechanism including a thrust dynamic pressure groove formed in a surface of the flange portion opposed to the sleeve member, and being disposed between the first end surface of the sleeve member and the flange portion. The sleeve member includes a through hole formed therein. The through hole extends between the first end surface of the sleeve member and the second end surface of the sleeve member or a portion of the radial dynamic pressure bearing mechanism on the side of the second end surface to form a circulation path together with a gap in the radial dynamic pressure bearing mechanism and a gap in the thrust dynamic pressure bearing mechanism. The circulation path is continuously filled with lubrication oil. The through hole has an end which is superposed on the thrust dynamic pressure groove during rotation of one of the sleeve member or the flange portion with respect to the other.

With this structure, during relative rotation, the dynamic pressure grooves in the thrust dynamic pressure bearing and the through hole are superposed sequentially. Therefore, a sufficient amount of the lubrication oil can be supplied to the ends of the thrust dynamic pressure grooves, and it is possible to reliably prevent local generation of a negative pressure and generation of air bubbles in the lubrication oil. It is more preferable that an opening end of the through hole be superposed on a radially outer end of the thrust dynamic pressure groove.

According to the present preferred embodiment, since the through hole rotates with respect to the thrust dynamic pressure groove, it is possible to efficiently minimize generation of the negative pressure in the thrust dynamic pressure bearing mechanism, thus preventing generation of air bubbles in the lubrication oil. Moreover, the inflow amount of the lubrication oil into the thrust dynamic pressure bearing mechanism from the outer peripheral side thereof can be increased. Therefore, generation of the negative pressure can be further minimized.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described with reference to the drawings. In the following description, terms indicating directions including vertical and lateral directions indicate directions on the drawings, and these terms do not limit the directions of the structure when finally assembled into an actual device.

First Preferred Embodiment

Figure 1:
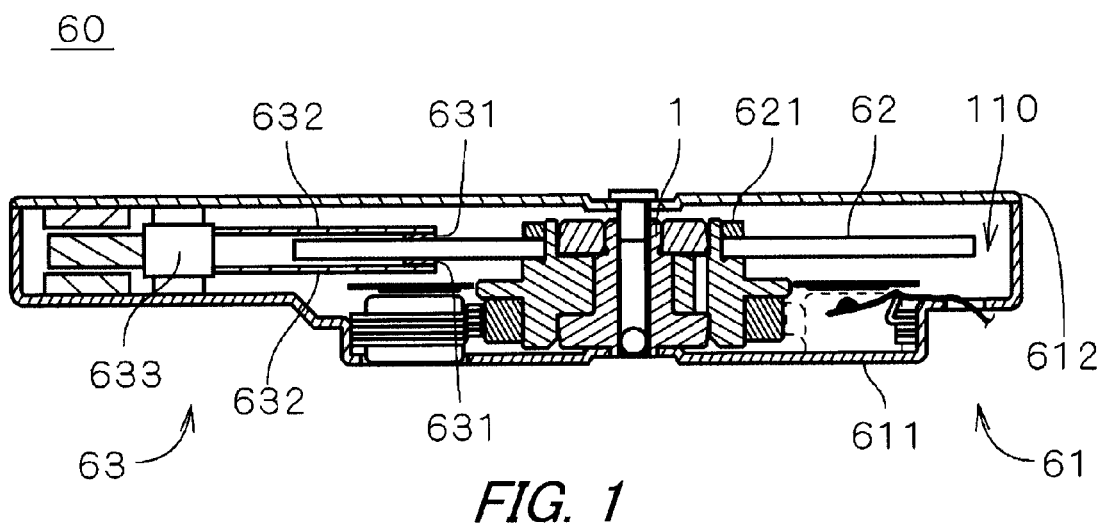
FIG. 1 shows an internal structure of a recording disk drive according to a first preferred embodiment of the present invention.

FIG. 1 shows an internal structure of a recording disk drive 60 including an electric spindle motor 1 (hereinafter referred to as "motor 1") according to a first preferred embodiment of the present invention. The recording disk drive 60 is a hard disk drive, and includes a recording disk 62 in the form of a circular disk on which information can be recorded, an access section 63 which reads and/or writes information from and on the recording disk 62, the electric motor 1 which holds and rotates the recording disk 62, and a housing 61 having an internal space 110 which accommodates the recording disk 62, the access section 63, and the motor 1.

As shown in FIG. 1, the housing 61 includes a box-like first housing member 611 provided at its upper portion with an opening. The first housing member 611 does not have a lid. The motor 1 and the access section 63 are mounted on a bottom in the first housing member 611. The housing 61 also includes a plate-like second housing member 612. The second housing member 612 covers the opening of the first housing member 611 to form the internal space 110. In the recording disk drive 60, the second housing member 612 is connected to the first housing member 611 to form the housing 61. Air in the internal space 110 is extremely clean and has almost no dust.

The recording disk 62 is placed on an upper portion of the motor 1 and fixed to the motor 1 by a clamper 621. The access section 63 has a head 631 which is adjacent to the recording disk 62, and an arm 632 supporting the head 631. The head 631 and the arm 632 form a head portion which magnetically reads and/or writes information. The access section 63 includes a head portion moving mechanism 633 which moves the arm 632, thereby moving the head 631 relative to the recording disk 62 and the motor 1. With this configuration, the head 631 accesses a necessary position of the recording disk 62 in a state where the head 631 is adjacent to the recording disk 62, and carries out a reading operation and/or a writing operation.

Figure 2:
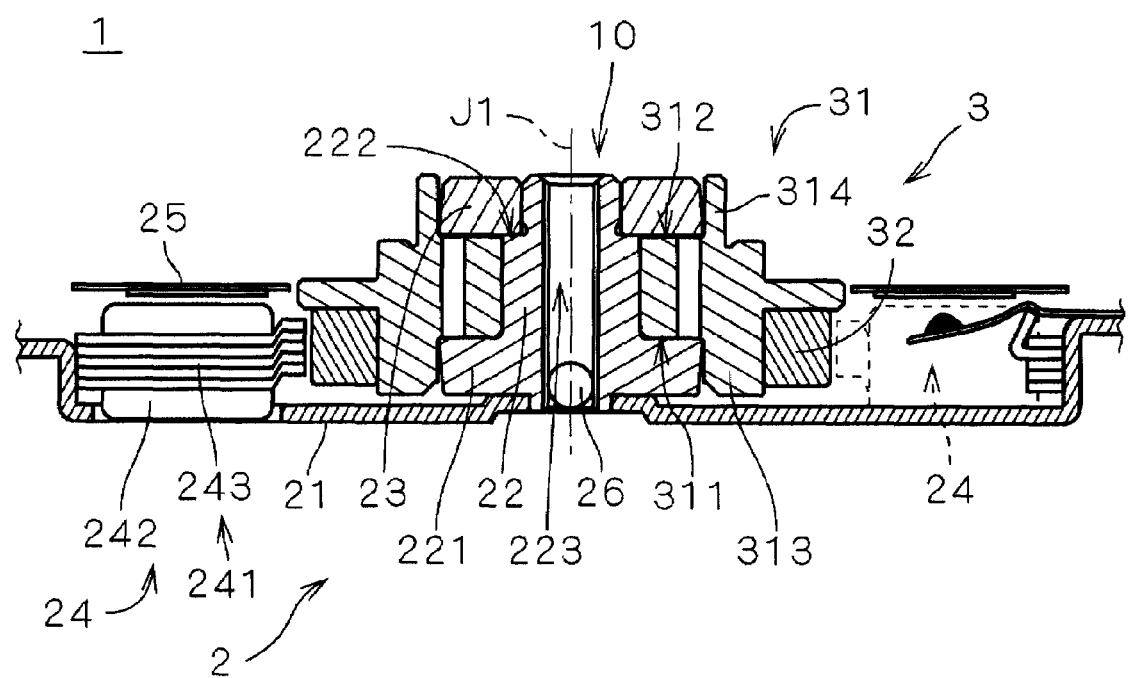
FIG. 2 is a vertical cross-sectional view showing a structure of a motor of the first preferred embodiment of the present invention.

FIG. 2 is a vertical cross-sectional view showing a structure of the motor 1 used for rotating the recording disk 62 (see FIG. 1). FIG. 2 is a primarily a vertical cross-sectional view in a plane including a center axis J1 of the motor 1, but the structure located behind the plane is partly shown within a broken line. As shown in FIG. 2, the motor 1 includes a stator 2 which is a stationary assembly, and a rotor 3 which is a rotating assembly. The rotor 3 is rotatably supported with respect to the stator 2 around the center axis J1 by a bearing assembly 10 (including a shaft 22, a sleeve member 31, and a ring member 23 that will be described later) utilizing a fluid dynamic pressure. In the following description, the side of the rotor 3 in a direction along the center axis J1 is defined as an upper side and the side of the stator 2 is defined as a lower side for convenience sake, but it is not always necessary that the center axis J1 matches the gravity direction.

The stator 2 includes a base plate 21 which is a base portion for holding various portions of the stator 2, and the shaft 22. One end of the shaft 22 is fixed to a predetermined mounting position of the base plate 21. At the other end of the shaft 22, a stepped portion 222 having a smaller radius than other portions of the shaft 22 is formed. The stator 2 also includes the ring member 23 mounted on the stepped portion 222 of the shaft 22, an armature 24 mounted on the base plate 21, and a thin magnetic shield plate 25 which is disposed above the armature 24 and which blocks electromagnetic noise from the armature 24. The base plate 21 is a portion of the first housing member 611 (see FIG. 1), and is formed together with other portions of the first housing member 611 as one unit by pressing a plate-like member preferably made of aluminum, aluminum alloy, or magnetic or non-magnetic iron-based metal.

A lower end of the shaft 22 is fixed to the base plate 21. At the lower end, the shaft 22 is provided with a flange portion 221 which extends outward from the center axis J1. A through hole 223 is formed in the shaft 22 along the center axis J1. The through hole 223 is provided at its upper portion with a female screw for screwing the second housing member 612 (see FIG. 1). A lower portion of the through hole 223 is sealed by an approximately spherical metal sealing member 26. The shaft 22 and the ring member 23 are preferably made of stainless steel or free-machining stainless steel, for example.

The armature 24 is mounted on the base plate 21 from above by press-fit or adhering. The armature 24 includes a core 241 preferably formed by laminating a plurality of (five, in this preferred embodiment, for example) core plates preferably formed of thin silicon steel. The core 241 includes a plurality of teeth 243 disposed radially around the center axis J1, and a ring-like core back for supporting the teeth 243 from the outside (i.e., the core back connects and supports ends of the respective teeth 243 far from the center axis J1). The thickness of the core plate forming the core 241 is preferably about 0.1 mm to about 0.35 mm, respectively, and more preferably about 0.2 mm, for example. Portions of the core plates corresponding to the teeth 243 and the core back, respectively, are integrally formed. Therefore, the teeth 243 and the core back are magnetically connected to each other.

The armature 24 further includes a plurality of coils 242 formed by winding conductive lines preferably having a diameter of, for example, about 0.05 mm to about 0.3 mm (more preferably, about 0.1 mm) many times around each of the teeth 243.

The rotor 3 includes an approximately cylindrical sleeve member 31. The sleeve member 31 is inserted onto the shaft 22 of the stator 2 with a small gap formed therebetween. The sleeve member 31 is a portion of the bearing assembly 10 which rotatably supports the rotor 3. The rotor 3 also includes a field magnet 32 mounted on the sleeve member 31 and disposed around the center axis J1. The sleeve member 31 is formed into an approximately substantially cylindrical shape around the center axis J1. The sleeve member 31 can be made of stainless steel, free-machining stainless steel, aluminum, aluminum alloy, copper, or phosphor bronze, for example. A lower end surface 311 of a portion of the sleeve member 31 functioning as a sleeve is opposed to the flange portion 221 of the shaft 22, and an upper end surface 312 opposite to the lower end surface 311 is opposed to the ring member 23. The field magnet 32 generates a torque (i.e., a rotation force) around the center axis J1 between the field magnet 32 and the armature 24.

Figure 3:
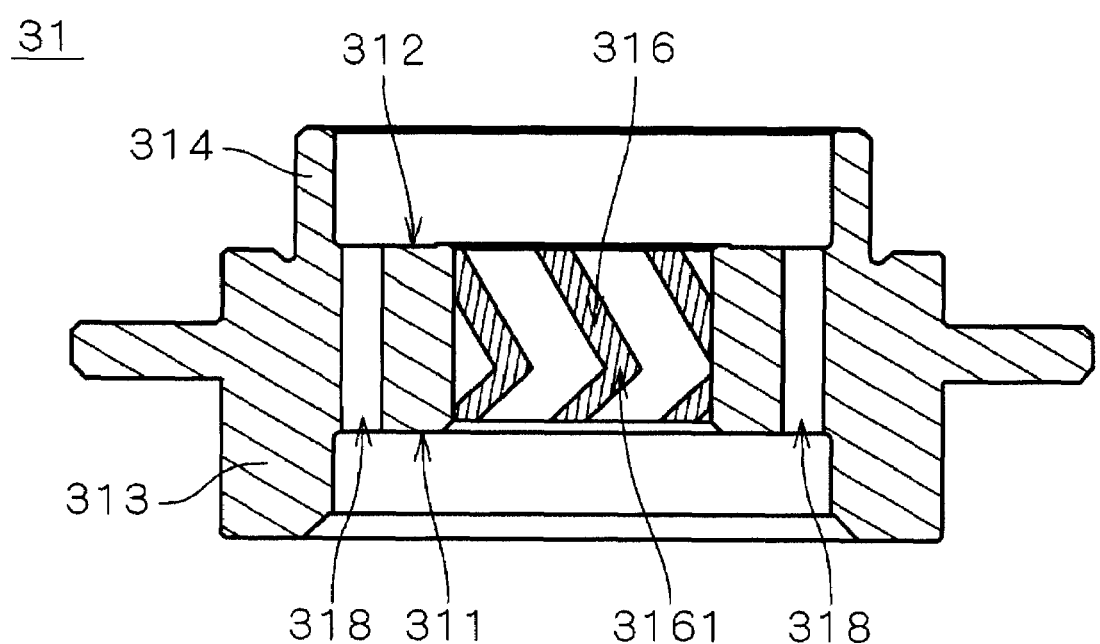
FIG. 3 is a vertical cross-sectional view showing a sleeve member of the first preferred embodiment of the present invention.

FIG. 3 is a vertical cross-sectional view showing the sleeve member 31. As shown in FIGS. 2 and 3, the sleeve member 31 includes a first annular projection 313 which projects from the lower end surface 311 to cover an outer peripheral surface of the flange portion 221 of the shaft 22, a second annular projection 314 which projects from the upper end surface 312 to cover an outer peripheral surface of the ring member 23, and two through holes 318 which extend between an outer periphery of the lower end surface 311 and the upper end surface 312. A diameter of the through hole 318 is, for example, preferably about 0.1 mm to about 0.6 mm, and more preferably about 0.2 mm to about 0.4 mm (about 0.4 mm in the present preferred embodiment, for example).

Figure 4:
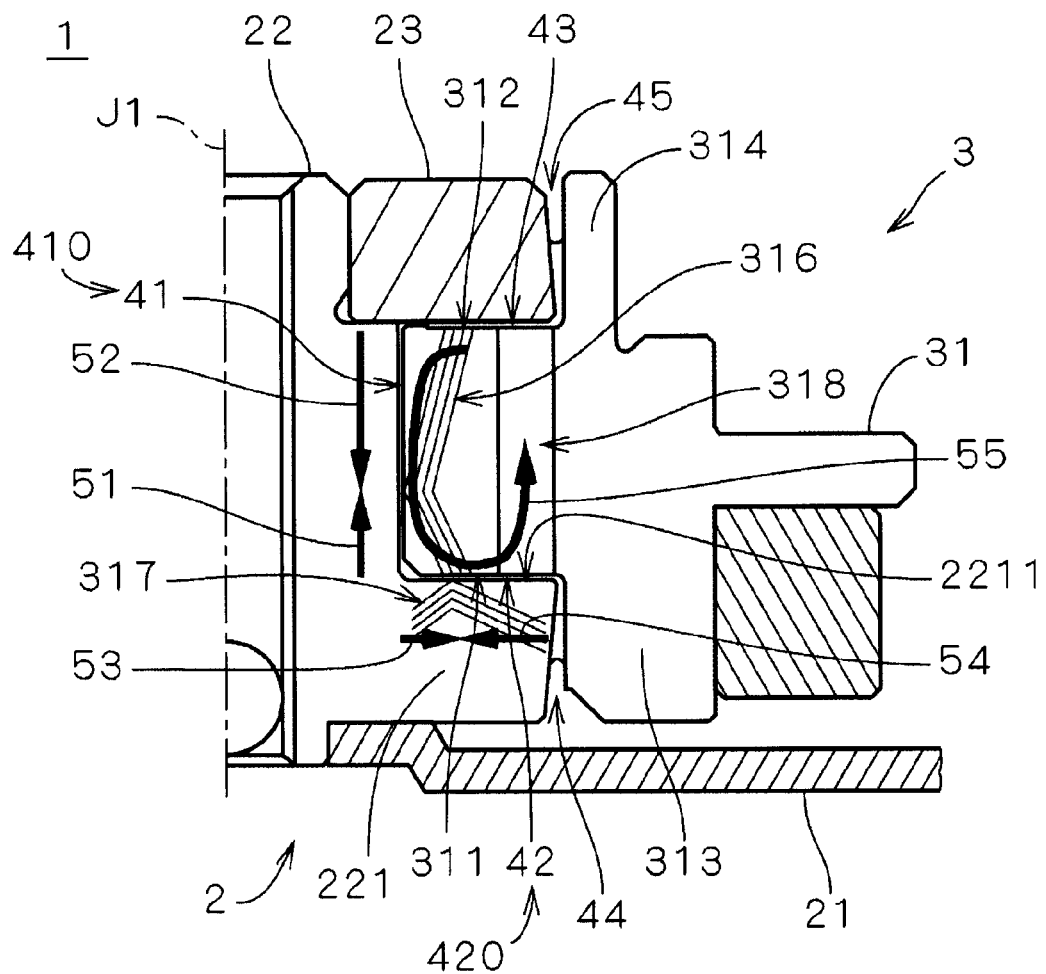
FIG. 4 is a partially enlarged vertical cross-sectional view of the motor of the first preferred embodiment of the present invention.

Next, the bearing assembly 10 utilizing a fluid dynamic pressure for rotatably supporting the rotor 3 of the motor 1 with respect to the stator 2 is described. FIG. 4 is a partially (right half in FIG. 2) enlarged vertical cross-sectional view of the motor 1. In FIG. 4, parallel oblique lines showing cross sections of the shaft 22 and the sleeve member 31 are omitted, and two herringbone grooves 316 and 317 that will be described later are shown with herringbone pattern symbols on members on which they are provided.

As shown in FIG. 4, fine gaps are provided between the outer peripheral surface of the shaft 22 and the inner peripheral surface of the sleeve member 31, between the lower end surface 311 of the sleeve member 31 and the flange portion 221 of the shaft 22, and between the ring member 23 and the upper end surface 312 of the sleeve member 31 in the motor 1. These gaps are referred to "side gap 41", "lower gap 42", and "upper gap 43".

The outer peripheral surface of the flange portion 221 is inclined and has an outer diameter gradually decreasing toward its lower side. A first tapered gap 44 is formed between the flange portion 221 and the first annular projection 313 such that the distance between the flange portion 221 and the first annular projection 313 gradually increases in a direction away from the lower end surface 311 of the sleeve member 31. Similarly, the outer peripheral surface of the ring member 23 is inclined and has an outer diameter gradually decreasing toward its upper side. A second tapered gap 45 is formed between the ring member 23 and the second annular projection 314 such that the distance between the ring member 23 and the second annular projection 314 gradually increases in a direction away from the upper end surface 312 of the sleeve member 31.

In the motor 1, the aforementioned gaps and the through holes 318 are continuously filled with lubrication oil as a working fluid. Thus, the bearing assembly of a so-called fully filled structure is formed. In the first tapered gap 44 and the second tapered gap 45, an interface of the lubrication oil which is continuous from the gaps has a meniscus-like shape due to capillary action and surface tension, thereby forming taper seals. Therefore, the first tapered gap 44 and the second tapered gap 45 function as oil buffers to prevent the lubrication oil from flowing out. In the motor 1, the oil buffer can be visible. Therefore, it is possible to easily perform charging of the lubrication oil and inspection after the charging of the lubrication oil.

The sleeve member 31 is formed at its inner peripheral surface with a radial dynamic pressure groove. The radial dynamic pressure groove generates, in lubrication oil, a dynamic pressure in which a pressure (shown with arrow 52) generated in a portion of the sleeve member 31 on the side of the upper end surface 312 during rotation of the rotor 3 is higher than a pressure (shown with arrow 51) generated in a portion on the side of the lower end surface 311. Thus, a radial dynamic pressure bearing mechanism 410 having the radial dynamic pressure groove is formed in the side gap 41. A thrust dynamic pressure groove is formed in a surface (hereinafter referred to as "upper surface") 2211 of the flange portion 221 opposed to the sleeve member 31. The thrust dynamic pressure groove generates, in the lubrication oil, a dynamic pressure in which a pressure (shown with arrow 54) generated in a portion on the side of the first annular projection 313 during rotation of the rotor 3 is higher than a pressure (shown with arrow 53) generated in a portion on the side of the shaft 22. Thus, a thrust dynamic pressure bearing mechanism 420 having the thrust dynamic pressure groove is formed in the lower gap 42. Among three widths, i.e., a width of a gap in the radial dynamic pressure bearing mechanism 410 (i.e., a width of the side gap 41), a width of a gap in the thrust dynamic pressure bearing mechanism 420 (i.e., a width of the lower gap 42), and a width of the through hole 318 (i.e., a diameter thereof), the width of the gap in the radial dynamic pressure bearing mechanism 410 is the narrowest, and the width of the through hole 318 is the widest. The width of the upper gap 43 is between the width of the thrust dynamic pressure bearing mechanism 420 (lower gap 42) and the width of the through hole 318. More specifically, the width of the gap in the radial dynamic pressure bearing mechanism 410 is about 2 μm to about 4 μm, the width of the gap in the thrust dynamic pressure bearing mechanism 420 is about 5 μm to about 8 μm, and the width of the upper gap 43 is about 20 μm to about 32 μm, for example.

To achieve a reduced-height motor 1, the number of positions in the radial dynamic pressure bearing mechanism 410 at which the dynamic pressure is maximum in a direction along the center axis J1 is only one.

As shown in FIGS. 3 and 4, in the motor 1, the radial dynamic pressure groove formed in the inner peripheral surface of the sleeve member 31 is a herringbone groove 316 which is formed into a V-shape opening toward a rotation direction of the sleeve member 31. The herringbone groove 316 has a deviated shape in which a portion thereof higher than a bent portion 3161 is longer than a portion thereof lower than the bent portion 3161. With this structure, a pressure generated in the lubrication oil at a location slightly lower than a substantially central portion of the side gap 41 when the rotor 3 rotates becomes maximum, and the lubrication oil is pushed toward a lower side in the direction along the center axis J1 (i.e., in the direction of arrow 52) by the amount corresponding to the deviation amount of the bent portion 3161 from the center of the herringbone groove 316.

Figure 5:
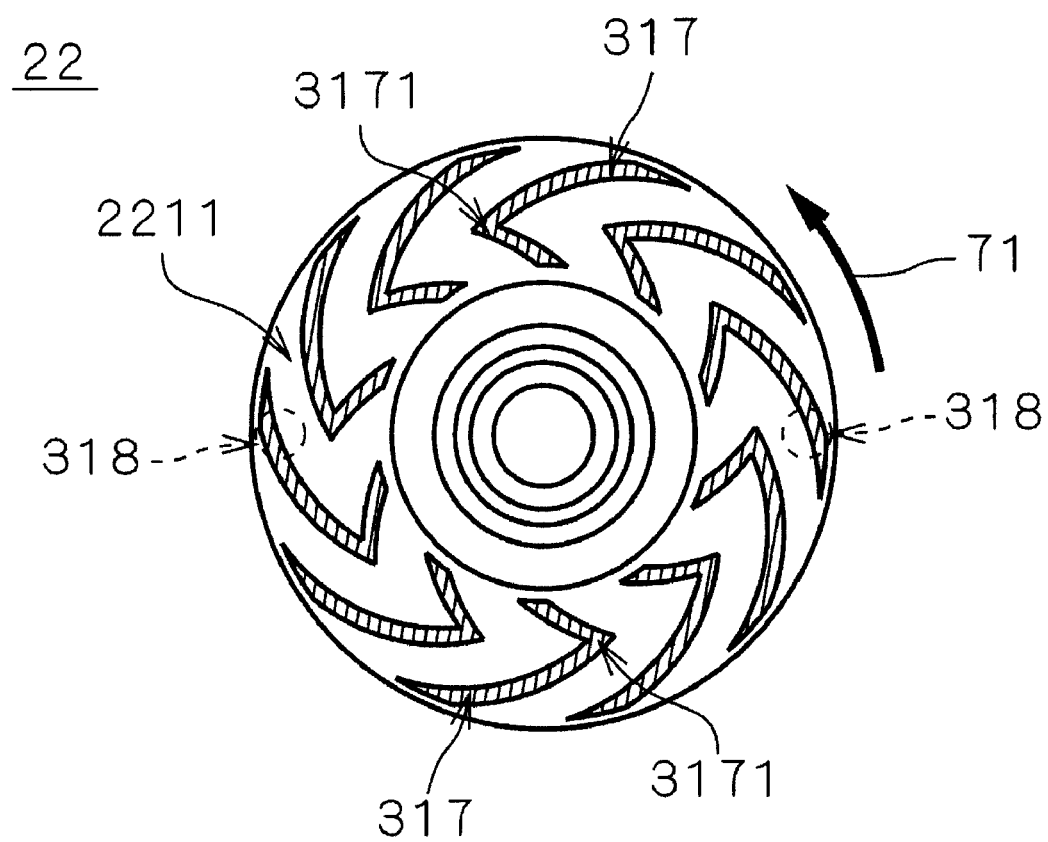
FIG. 5 is a plan view of a shaft of the first preferred embodiment of the present invention.

FIG. 5 is a plan view of the shaft 22. As shown in FIGS. 4 and 5, in the shaft 22, a thrust dynamic pressure groove formed in an upper surface 2211 is a herringbone groove 317. The herringbone groove 317 is formed into a V-shape which opens in a direction opposite from the rotation direction 71 (i.e., rotation direction of the rotor 3) of the sleeve member 31. The herringbone groove 317 has a deviated shape in which a portion thereof located radially outside the bent portion 3171 is longer than a portion radially inside the bent portion 3171. Thus, a pressure generated in the lubrication oil at a location slightly inward from the substantially central portion of the lower gap 42 when the rotor 3 rotates becomes maximum, and the lubrication oil is pushed radially inward (i.e., in the direction of arrow 54) by the amount corresponding to the deviation amount of the bent portion 3171 from the center of the herringbone groove 317.

With these dynamic pressure bearing mechanisms, it is possible to minimize generation of negative pressure in the lubrication oil in a region in the thrust dynamic pressure bearing mechanism 420 on the side of the shaft 22 when the bearing assembly rotates the rotor 3. Therefore, generation of air bubbles caused by the negative pressure can be prevented, thus preventing abnormal vibration and seizing caused by the air bubbles.

As described above, in the motor 1, the gaps (i.e., the side gap 41, the lower gap 42, the upper gap 43, the first tapered gap 44, and the second tapered gap 45) formed between the shaft 22, the ring member 23, and the sleeve member 31, as well as the two through holes 318 formed in the sleeve member 31 are continuously filled with the lubrication oil, and when the rotor 3 rotates, the rotor 3 is supported utilizing fluid dynamic pressure caused by the lubrication oil. When the rotor 3 rotates around the center axis J1 with respect to the stator 2, the recording disk 62 (see FIG. 1) mounted on the rotor 3 rotates.

As shown in FIG. 4, in the motor 1, the lubrication oil pushed downward in the direction along the center axis J1 in the side gap 41 (i.e., direction of arrow 52) is returned to the side gap 41 through the lower gap 42, the through holes 318 and the upper gap 43, in that order, and therefore a circulation path for the lubrication oil shown with arrow 55 is formed. In other words, the through holes 318 for introducing the lubrication oil toward an outer peripheral side of the ring member 23 from an outer peripheral side of the flange portion 221 form the circulation path 55 which is continuously filled with the lubrication oil together with the gap in the radial dynamic pressure bearing mechanism 410, the gap in the thrust dynamic pressure bearing mechanism 420, and the upper gap 43. With this structure, a pressure difference in the lubrication oil between both end surfaces of the sleeve member 31 can be minimized, and even if air bubbles are generated in the lubrication oil, the generated air bubbles can be discharged out from the bearing assembly through the taper seal in the first tapered gap 44 or the second tapered gap 45.

In the motor 1, the thrust dynamic pressure groove is formed in the upper surface 2211 of the flange portion 221. With this configuration, it is possible to more reliably prevent generation of negative pressure in the lubrication oil. As shown in FIG. 5 with a broken line, the two through holes 318 of the sleeve member 31 opposed to the upper surface 2211 of the flange portion 221 are arranged near an outer edge of the lower end surface 311 of the sleeve member 31, and the herringbone grooves 317 are formed to an outer edge of the upper surface 2211 of the flange portion 221. More specifically, a distance from the center axis J1 to the outer end of the herringbone groove 317 is longer than a distance from the center axis J1 to a portion of the through hole 318 closest to the center axis J1. Therefore, when the sleeve member 31 rotates relative to the flange portion 221, the radially outer ends of the herringbone grooves 317 and an opening end of the through hole 318 are superposed on each other (i.e., a locus of the through hole 318 and a region where the herringbone grooves 317 are formed are superposed on each other). When the sleeve member 31 rotates, it is unnecessary that the ends of the herringbone grooves 317 cross the entire through hole 318, and the ends of the herringbone grooves 317 may cross a portion of the through hole 318.

If the lower end surface 311 is formed with herringbone grooves and the flange portion 221 is not formed with the herringbone grooves 317, both the through holes 318 and the thrust dynamic pressure grooves are provided in the sleeve member 31 which rotates. Therefore, one or more of the thrust dynamic pressure grooves are always separated from the through hole 318. As a result, the possibility that a negative pressure is generated in a fine region at an end of the thrust dynamic pressure groove located away from the through hole 318 in the circumferential direction becomes relatively high. Moreover, since the lower end surface 311 is a bottom surface of a recessed portion, its outer edge is a curved surface having a radius of curvature of a certain distance. Therefore, the thrust dynamic pressure grooves cannot be sufficiently formed up to an outer edge. As a result, the thrust dynamic pressure grooves and the through hole 318 are separated from each other in the radial direction, and it is difficult to efficiently minimize the generation of negative pressure.

On the other hand, in the motor 1, as shown in FIG. 4, the thrust dynamic pressure groove is formed in the upper surface 2211 of the flange portion 221 of the shaft 22 fixed to the base plate 21, and the two through holes 318 rotate together with the sleeve member 31 so that ends of the herringbone grooves 317 and the through holes 318 are sequentially superposed on each other. Thus, a sufficient amount of the lubrication oil is supplied to ends of the thrust dynamic pressure grooves, and it is possible to more reliably prevent generation of a negative pressure and generation of air bubbles in the lubrication oil.

Figure 6:
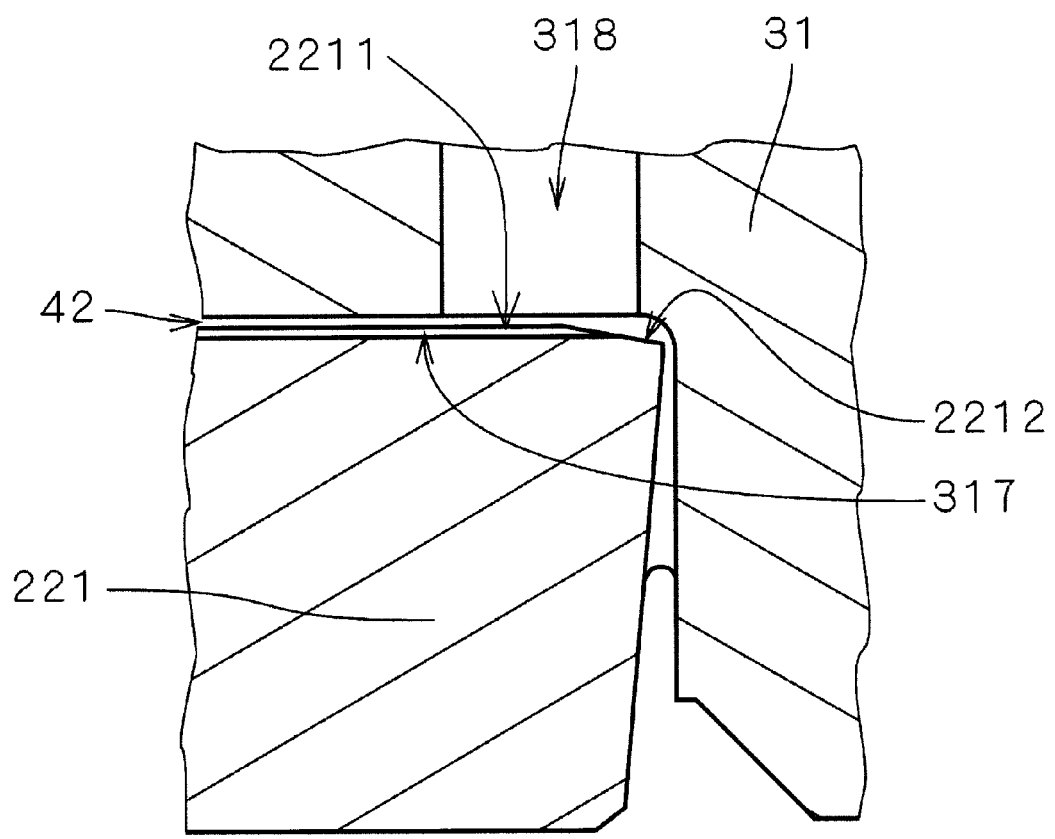
FIG. 6 is an enlarged vertical cross-sectional view of a lower gap of the first preferred embodiment of the present invention.

FIG. 6 is an enlarged vertical cross-sectional view of the lower gap 42. As shown in FIG. 6, an outer edge of the upper surface 2211 of the flange portion 221 is provided with a tapered portion 2212. In the tapered portion 2212, a gap between the sleeve member 31 and the upper surface 2211 of the flange portion 221 (i.e., the lower gap 42) gradually becomes wider in the radially outward direction. With this, the ends of the herringbone grooves 317 are opened toward the outside and can be extended to the tapered portion 2212. Thus, an inflow amount of the lubrication oil scraped from the outer peripheral side of the lower gap 42 opposed to the through hole 318 is increased, and the lubrication oil can smoothly flow into the herringbone grooves 317. Please note that an inside outline of the tapered portion 2212 is not shown in FIG. 5.

Figure 7:
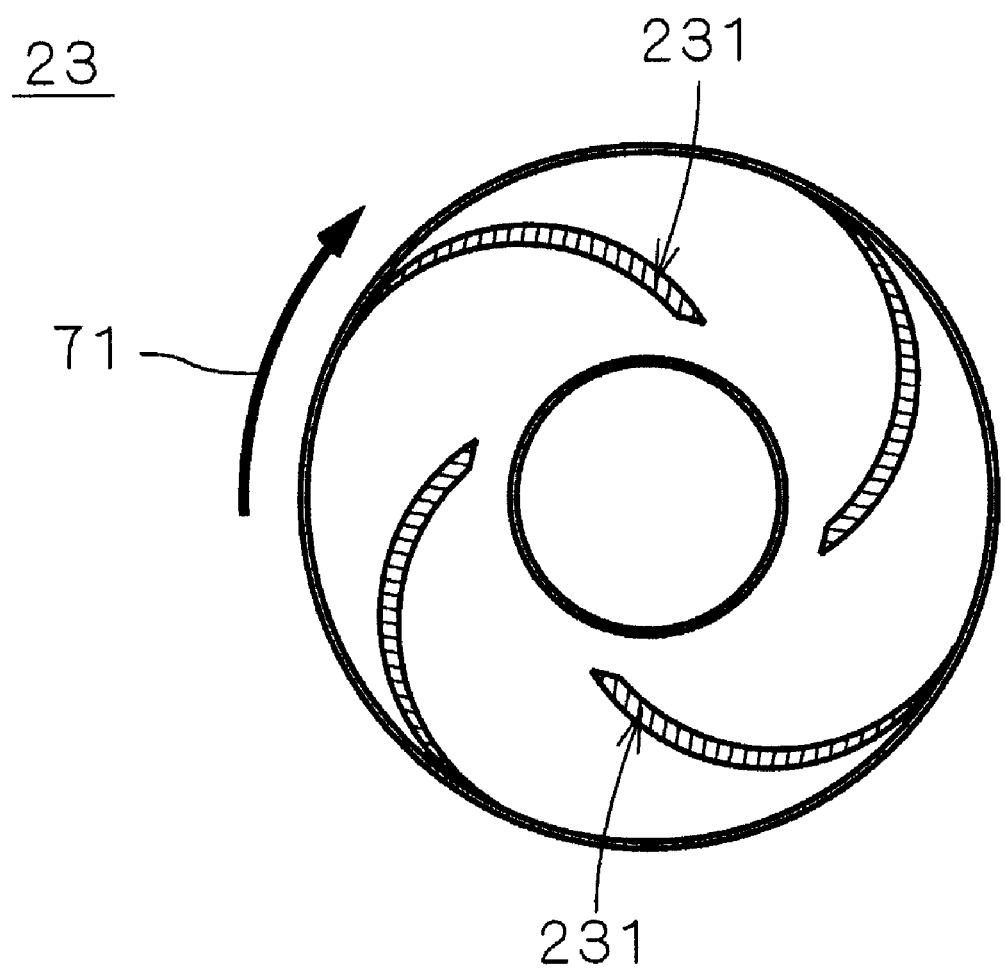
FIG. 7 is a bottom view showing a ring member of the first preferred embodiment of the present invention.

FIG. 7 is a bottom view of the ring member 23. As shown in FIG. 7, the ring member 23 is provided at its lower surface (i.e., the surface opposed to the upper end surface 312 of the sleeve member 31) with four stirring grooves 231 for stirring the lubrication oil. Each of the stirring grooves 231 is a spiral groove extending radially outward and in a direction opposite from the rotation direction 71 of the sleeve member 31. With this, when the rotor 3 rotates, the lubrication oil is pushed radially inward in the upper gap 43 (see FIG. 4) by a pressure generated by the stirring grooves 231. Therefore, it is possible to prevent generation of a negative pressure in a shaft-side region of the upper gap 43.

Figure 8:
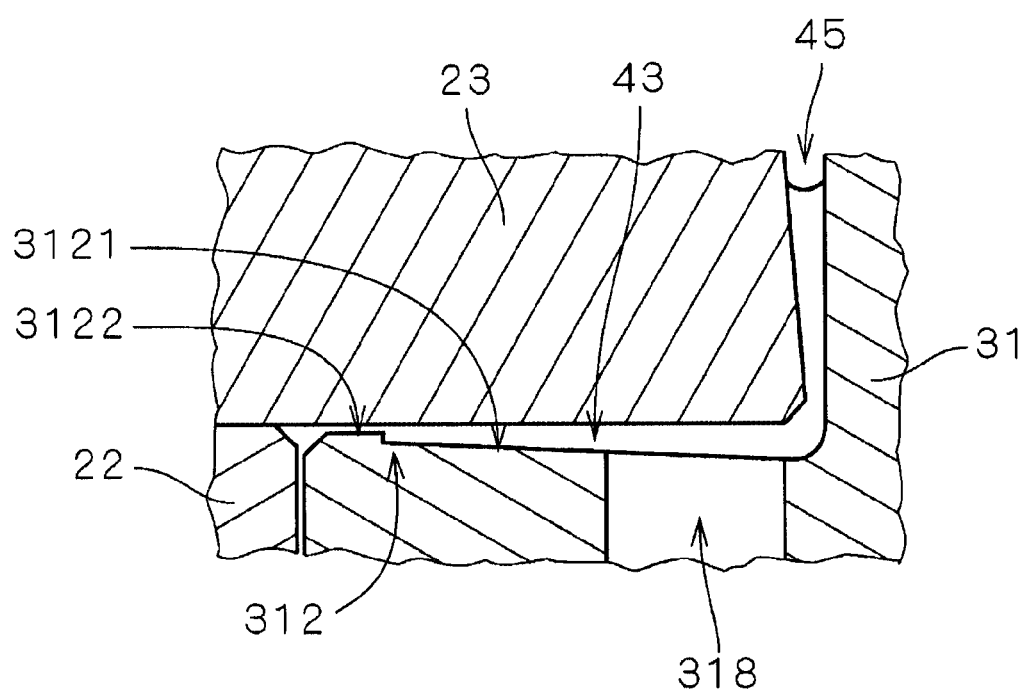
FIG. 8 is an enlarged vertical cross-sectional view of an upper gap of the first preferred embodiment of the present invention.

FIG. 8 is an enlarged vertical cross-sectional view of the upper gap 43. As shown in FIG. 8, the upper end surface 312 of the sleeve member 31 is formed with a tapered portion 3121 in which a gap (i.e., the upper gap 43) between the ring member 23 and the upper end surface 312 gradually becomes wider in the radially outward direction. By setting the pressure in a radially inner region of the upper gap 43 lower than that in a radially outer region of the upper gap 43 and forming the tapered portion 3121, air bubbles existing in the upper gap 43 or air bubbles moved to the upper side opening of the through hole 318 can be easily discharged out from the bearing assembly through the taper seal in the second tapered gap 45. The sleeve member 31 includes a projection 3122 which projects toward the ring member 23 with respect to the tapered portion 3121 around the shaft 22 on the upper end surface 312. Even when the sleeve member 31 moves upward, the projection 3122 comes into contact with the ring member 23 and restricts further upward movement of the sleeve member 31. The sleeve member 31 is formed to have a highly precise dimension between the lower end surface 311 and the projection 3122. Therefore, the mounting position of the sleeve member 31 in the direction along the center axis J1 can be precisely determined.

As described above, in the motor 1, the herringbone grooves 317 which are the thrust dynamic pressure grooves are formed in the upper surface 2211 of the flange portion 221 of the shaft 22 fixed to the base plate 21, and the through hole 318 rotates relative to the radially outer end of the thrust dynamic pressure grooves. In this structure, the lubrication oil can be supplied to all of the radially outer ends of the dynamic pressure grooves at which a negative pressure is most prone to be generated in the thrust dynamic pressure bearing mechanism 420. Therefore, generation of the negative pressure can be efficiently minimized. Especially, generation of the negative pressure can be efficiently minimized even in a reduced-height motor 1 in which a dynamic pressure becomes maximum at only one position in the direction along the center axis J1 in the radial dynamic pressure bearing mechanism 410.

In addition, since the upper surface 2211 of the flange portion 211 is formed at its outer edge with the tapered portion 2212, the dynamic pressure groove can extend up to the outer peripheral side of the thrust dynamic pressure bearing mechanism 420. Therefore, the inflow amount of the lubrication oil from the outer peripheral side of the thrust dynamic pressure bearing mechanism 420 can increase, and generation of a negative pressure can be further prevented. As a result, it is possible to prevent air bubbles generated by the negative pressure in the lubrication oil from staying, thus reducing NRRO and enhancing the reliability of the bearing assembly. The above-described structure is especially suitable when herringbone grooves where a high negative pressure is prone to be generated are provided as the thrust dynamic pressure grooves.

Second Preferred Embodiment

Figure 9:
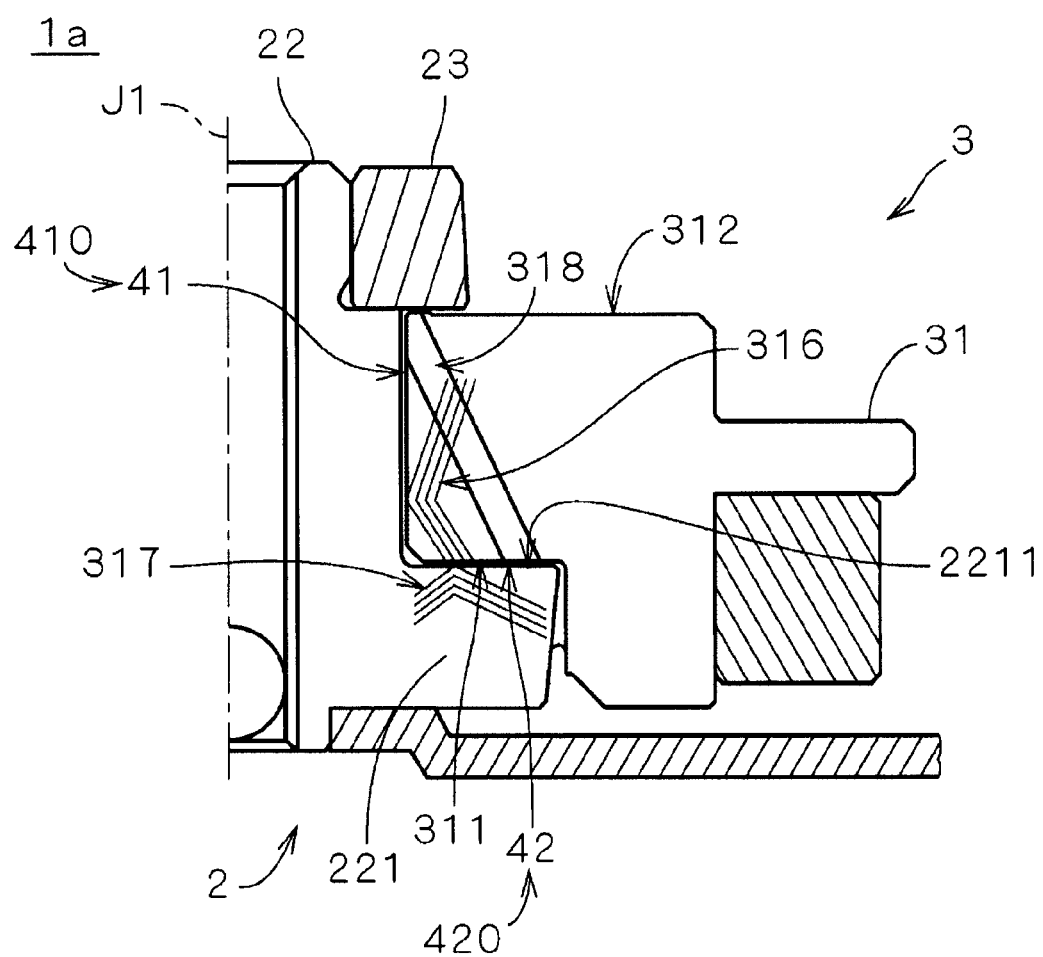
FIG. 9 is a vertical cross-sectional view of a motor according to a second preferred embodiment of the present invention.

FIG. 9 is a vertical cross-sectional view of a motor 1a according to a second preferred embodiment of the present invention. Components in this preferred embodiment having the same functions as those of the first preferred embodiment are designated with the same names and reference numerals even if they have different shapes from those of the first preferred embodiment. The motor 1a is used for rotating the recording disk 62 shown in FIG. 1 like the motor 1 shown in FIG. 4. Except for the shapes of the sleeve member 31 and the ring member 23, the motor 1a has the same structure as that of the motor 1. The same structures are labeled with the same reference numerals.

In the motor 1a, like the motor 1, herringbone grooves 316 functioning as radial dynamic pressure grooves are formed in an inner peripheral surface of a sleeve member 31, and a radial dynamic pressure bearing mechanism 410 is formed in a side gap 41 between an outer peripheral surface of a shaft 22 and an inner peripheral surface of the sleeve member 31. Herringbone grooves 317 functioning as thrust dynamic pressure grooves are formed in an upper surface 2211 (opposed to the sleeve member 31) of a flange portion 221 of the shaft 22, and a thrust dynamic pressure bearing mechanism 420 is formed in a lower gap 42 between the flange portion 221 and a lower end surface 311 of a portion which serves as the sleeve member 31.

Through holes 318 are formed in the sleeve member 31. The through holes 318 are inclined with respect to the center axis J1, and extend between a portion of the radial dynamic pressure bearing mechanism 410 on the side of the upper end surface 312 (i.e., the upper side portion) and the lower end surface 311 of the sleeve member 31, instead of between the lower end surface 311 and the upper end surface 312 opposite from the lower end surface 311. Thus, the through holes 318 form a circulation path continuously filled with the lubrication oil together with the side gap 41 and the lower gap 42. The behavior of the dynamic pressure generated by the radial dynamic pressure bearing mechanism 410 and the thrust dynamic pressure bearing mechanism 420 is the same as that shown with arrows 51 to 54 in FIG. 4. In the motor 1a, the lubrication oil circulates by flowing from the lower gap 42 and returning to the lower gap 42 through the through holes 318 and the side gap 41, in that order. In other words, in the motor 1 shown in FIG. 4, the upper gap 43 is a portion of the circulation path for lubrication oil, but in the motor 1a shown in FIG. 9, the upper gap 43 is not included in the circulation path.

The positional relation between the herringbone grooves 317 in the flange portion 221 and an opening end of the through holes 318 on the side of the flange portion 221 is the same as that shown in FIG. 5. When the sleeve member 31 rotates relative to the flange portion 221, the opening end of the through holes 318 is superposed on a radially outer end of the herringbone grooves 317. With this structure, it is possible to efficiently minimize generation of a negative pressure at all of the radially outer ends of the dynamic pressure grooves at which the negative pressure is most prone to be generated in the thrust dynamic pressure bearing mechanism 420, as in the motor 1 of the first preferred embodiment.

Also in the motor 1a, among the three widths, i.e., the width of the gap in the radial dynamic pressure bearing mechanism 410, the width of the gap in the thrust dynamic pressure bearing mechanism 420, and the width of the through holes 318 (i.e., a diameter thereof), the width of the gap in the radial dynamic pressure bearing mechanism 410 is the narrowest, and the width of the through holes 318 is the widest. To achieve a reduced-height motor, the number of positions in the radial dynamic pressure bearing mechanism 410 at which the dynamic pressure is maximum is only one.

In the second preferred embodiment, in addition to the above-described effects, the same effects as those obtained by the first preferred embodiment can also be obtained.

Third Preferred Embodiment

Figure 10:
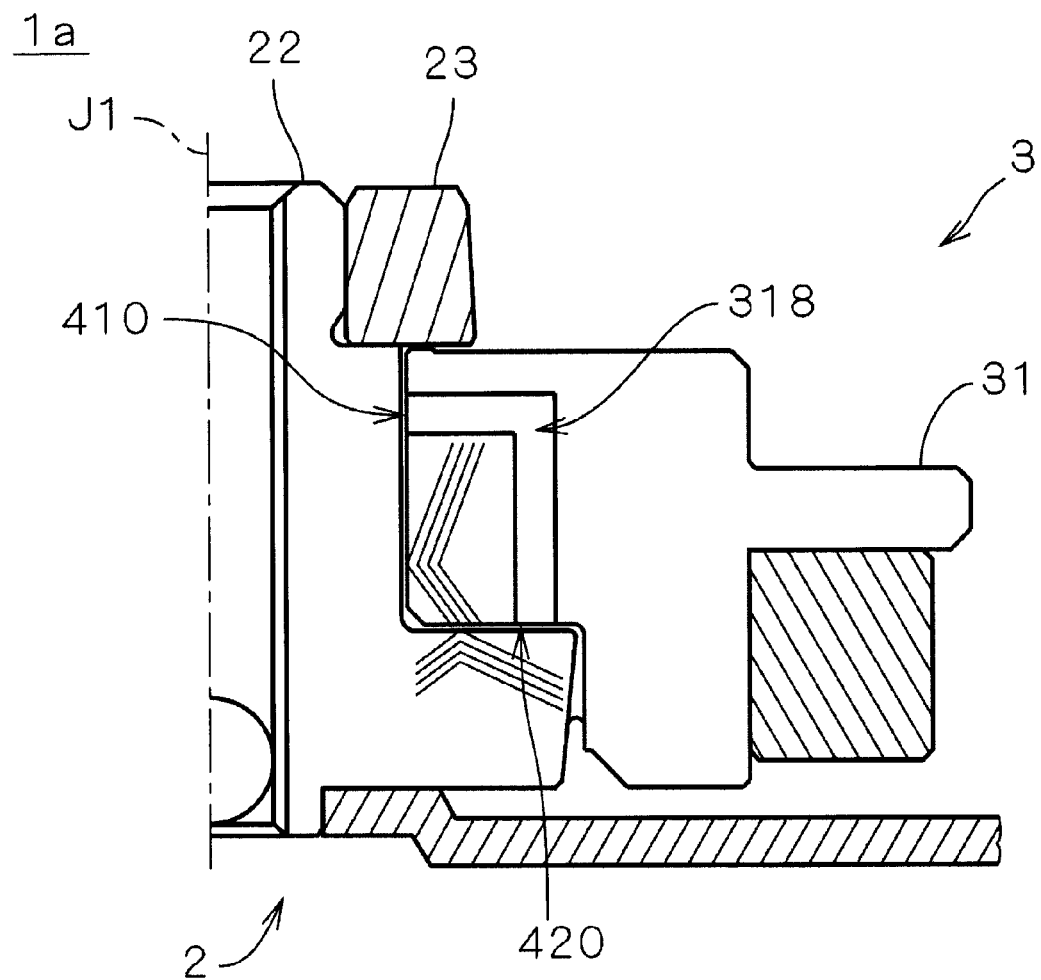
FIG. 10 is a vertical cross-sectional view of a motor according to a third preferred embodiment of the present invention.

The shape of the through hole 318 of the motor 1a is not limited to a straight and an inclined shape. For example, the through hole 318 can be formed by connecting a hole horizontally extending from an upper portion of the radial dynamic pressure bearing mechanism 410 and a hole vertically extending from the thrust dynamic pressure bearing mechanism 420 to each other, as shown in FIG. 10.

Also in this preferred embodiment, the same effects as those obtained by the first and second preferred embodiments can be obtained.

Other Preferred Embodiments

Although exemplary preferred embodiments of the present invention have been explained above, the present invention is not limited to the above. The present invention can be modified in various ways.

In each of the aforementioned motors 1 and 1a, preferably the shaft 22 is fixed to the base plate 21 and the sleeve member 31 rotates with respect to the flange portion 221 of the shaft 22. However, a structure may be used in which the sleeve member having the through holes is fixed to the base plate, the shaft having the flange portion with the thrust dynamic pressure grooves formed therein is formed integrally with a hub on which a field magnet is mounted on the side of a rotor, and the shaft rotates with respect to the sleeve member. Moreover, the field magnet may be disposed outside of the armature.

In addition, in each of the aforementioned motors 1 and 1a, the herringbone grooves which function as the radial dynamic pressure groove formed in the inner peripheral surface of the sleeve member 31 have a shape in which the bent portions are deviated to one end of the grooves. However, the shape of the radial dynamic pressure groove is not limited thereto. For example, any other shape may be used which can make a dynamic pressure different between the sides of the bent portion (or portion that can be regarded as the bent portion) by increasing the number of grooves of in a region where a high dynamic pressure is required, widening the groove, or increasing the depth of the groove, without deviating the position of the bent portion. In this case, the same effects as those obtained by the aforementioned sleeve member 31 can be obtained.

Similarly, in the thrust dynamic pressure groove, the dynamic pressures on both sides of the bent portion (or position that can be regarded as the bent portion) may be made different from each other by changing the number of grooves, the width of the groove, or the depth of the groove. In a case of the thrust dynamic pressure bearing mechanism 420, even when outer portions and inner portions of the herringbone grooves have the same lengths, a pressure generated in the outer portions is higher than that in the inner portions because the lubrication oil in the outer portions flows faster. Therefore, generation of a negative pressure on the inner peripheral side of the thrust dynamic pressure bearing mechanism 420 can be minimized.

The radial dynamic pressure groove and the thrust dynamic pressure groove are not limited to the herringbone grooves. For example, two spiral grooves having different directions may be formed to provide a dynamic pressure groove which has substantially the same function as that of the herringbone grooves. Even in a case where the spiral grooves are provided, the through holes 318 rotate while being relatively superposed on the radially outer end of the dynamic pressure groove at which the negative pressure is prone to be generated, as in a case where the herringbone grooves are formed. Thus, it is possible to prevent generation of a negative pressure.

In the above-described preferred embodiments, the thrust dynamic pressure bearing mechanism 420 is preferably formed in the lower gap 42 between the sleeve member 31 and the flange portion 221. Alternatively, the thrust dynamic pressure bearing mechanism 420 can be formed in each of the lower gap 42 and the upper gap 43. In this case, the through holes 318 are not used for circulating the lubrication oil but can minimize generation of a negative pressure caused by a pressure difference between in the upper gap 43 and in the lower gap 42 due to a machining error.

In each of the aforementioned motors 1 and 1a, the number of through holes 318 provided in the sleeve member 31 is preferably two. However, the present invention is not limited thereto. The number of through holes 318 may be one or three or more. Moreover, in order to efficiently minimize generation of a negative pressure, it is preferable that the opening end of the through holes 318 to the thrust dynamic pressure bearing mechanism 420 be superposed on the radially outer end of the thrust dynamic pressure groove during rotation of the sleeve member 31 relative to the shaft 22. However, the opening end of the through holes 318 may be superposed on a portion of the thrust dynamic pressure groove other than the end thereof.

Furthermore, the recording disk drive 62 having the motor of any of the aforementioned preferred embodiments is not limited to the hard disk drive, but may be a disk drive such as a removable disk drive.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bearing assembly utilizing a fluid dynamic pressure for use in an electric motor, comprising:
   a shaft provided at a first end with a flange portion extending outwardly from a center axis of the shaft;
   an approximately cylindrical sleeve member inserted onto the shaft and having a first end surface opposed to the flange portion and a second end surface opposite to the first end surface;
   a radial dynamic pressure bearing mechanism disposed between an outer peripheral surface of the shaft and an inner peripheral surface of the sleeve member; and
   a thrust dynamic pressure bearing mechanism including a thrust dynamic pressure groove provided in a surface of the flange portion opposed to the sleeve member, the thrust dynamic bearing mechanism being disposed between the first end surface of the sleeve member and the flange portion; wherein
   the sleeve member includes a through hole provided therein, and the through hole extends between the first end surface of the sleeve member and the second end surface of the sleeve member or a portion of the radial dynamic pressure bearing mechanism on a side of the second end surface of the sleeve member, the through hole forming a circulation path continuously filled with lubrication oil together with a gap in the radial dynamic pressure bearing mechanism and a gap in the thrust dynamic pressure bearing mechanism, the through hole having an end which is superposed on the thrust dynamic pressure groove during rotation of one of the sleeve member and the flange portion with respect to the other.

2. The bearing assembly according to claim 1, wherein an outer end of the thrust dynamic pressure groove and the end of the through hole are superposed on each other during rotation of one of the sleeve member and the flange portion with respect to the other.

3. The bearing assembly according to claim 2, wherein the flange portion includes a tapered portion near an outer edge of the surface thereof opposed to the sleeve member, a distance between the sleeve member and the tapered portion of the flange portion gradually increases in a radially outward direction.

4. The bearing assembly according to claim 3, further comprising a ring member opposed to the second end surface of the sleeve member, wherein the through hole extends between the first end surface and the second end surface of the sleeve member, and a gap between the second end surface and the ring member forms a portion of the circulation path.

5. The bearing assembly according to claim 4, wherein the ring member is mounted on a second end of the shaft and restricts movement of the sleeve member in a direction along the center axis.

6. The bearing assembly according to claim 5, wherein in the radial dynamic pressure bearing mechanism, a number of positions at which a dynamic pressure is maximum in the direction along the center axis is one.

7. The bearing assembly according to claim 6, wherein among a width of a gap in the radial dynamic pressure bearing mechanism, a width of a gap in the thrust dynamic pressure bearing mechanism, and a width of the through hole, the width of the gap in the radial dynamic pressure bearing mechanism is the narrowest, and the width of the through hole is the widest.

8. An electric motor comprising:
a bearing assembly according to claim 7;
a base portion to which one of the shaft and the sleeve member is fixed;
an armature mounted on the base portion; and
a field magnet mounted on the other one of the shaft and the sleeve member, and being operable to generate a torque around the center axis between the armature and the field magnet.

9. A recording disk drive comprising:
a recording disk operable to store information thereon;
a motor according to claim 8 arranged to rotate the recording disk;
a head portion operable to perform at least one of reading and writing of information from and on the recording disk; and
a head portion moving mechanism operable to move the head portion with respect to the recording disk and the motor.

10. The bearing assembly according to claim 6, wherein the thrust dynamic pressure groove is a herringbone groove.

11. The bearing assembly according to claim 10, wherein among a width of a gap in the radial dynamic pressure bearing mechanism, a width of a gap in the thrust dynamic pressure bearing mechanism, and a width of the through hole, the width of the gap of the radial dynamic pressure bearing mechanism is the narrowest, and the width of the through hole is the widest.

12. An electric motor comprising:
a bearing assembly according to claim 11;
a base portion to which one of the shaft and the sleeve member is fixed;
an armature mounted on the base portion; and
a field magnet mounted on the other one of the shaft and the sleeve member, and being operable to generate a torque around the center axis between the armature and the field magnet.

13. A recording disk drive comprising:
a recording disk operable to store information thereon;
a motor according to claim 12 operable to rotate the recording disk;
a head portion operable to perform reading and writing of information from and on the recording disk; and
a head portion moving mechanism operable to move the head portion with respect to the recording disk and the motor.

14. An electric motor comprising:
a bearing assembly according to claim 4;
a base portion to which one of the shaft and the sleeve member is fixed;
an armature mounted on the base portion; and
a field magnet mounted on the other one of the shaft and the sleeve member, and being operable to generate a torque around the center axis between the armature and the field magnet.

15. A recording disk drive comprising:
a recording disk operable to store information thereon;
a motor according to claim 14 arranged to rotate the recording disk;
a head portion operable to perform at least one of reading and writing of information from and on the recording disk; and
a head portion moving mechanism operable to move the head portion with respect to the recording disk and the motor.

* * * * *